(12) United States Patent
Taranov

(10) Patent No.: US 9,817,877 B2
(45) Date of Patent: Nov. 14, 2017

(54) OPTIMIZING DATA PROCESSING USING DYNAMIC SCHEMAS

(71) Applicant: MICROSOFT TECHNOLOGY LICENSING, LLC, Redmond, WA (US)

(72) Inventor: Igor Taranov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/931,017

(22) Filed: Nov. 3, 2015

(65) Prior Publication Data

US 2016/0055223 A1 Feb. 25, 2016

Related U.S. Application Data

(63) Continuation of application No. 13/887,557, filed on May 6, 2013, now Pat. No. 9,218,403, which is a
(Continued)

(51) Int. Cl.
*G06F 7/00* (2006.01)
*G06F 17/30* (2006.01)
*G06F 9/30* (2006.01)

(52) U.S. Cl.
CPC .. *G06F 17/30569* (2013.01); *G06F 17/30292* (2013.01); *G06F 17/30318* (2013.01); *G06F 17/30339* (2013.01); *G06F 9/30192* (2013.01)

(58) Field of Classification Search
CPC ......... G06F 17/30595; G06F 17/30448; G06F 17/30392
(Continued)

(56) References Cited

U.S. PATENT DOCUMENTS 5,499,371 A 3/1996 Henninger et al.
5,717,919 A 2/1998 Kodvalla et al.
(Continued)

FOREIGN PATENT DOCUMENTS

CN 101027879 A 8/2007

OTHER PUBLICATIONS

Catharine M. Wyss et. al., Extending Relational Query Optimization to Dynamic Schemas for Information Integration in Multi databases, SIGMOD '07 Proceedings of the 2007 ACM SIGMOD international conference on Management of data, 2007 (12 pages).
(Continued)

*Primary Examiner* — Cheyne D Ly
(74) *Attorney, Agent, or Firm* — Workman Nydegger

(57) ABSTRACT

A computer system access feed data belonging to a particular feed, and executes a dynamic server statement to create a relational dataset with data type fields from the feed data in an in-memory table of the server. The dynamic server statement is stored within metadata associated with the feed. The computer system also applies a second dynamic server statement to the data feed which applies one or more data processing conditions indicated in the metadata. The second dynamic server statement is also stored within the metadata associated with the feed. Upon determining that one or more feed data rows match the data processing conditions, the computer system places feed data row information about the matching data rows into an alert table that includes references to a regional blob table with blob data, thereby triggering an alert.

20 Claims, 5 Drawing Sheets

Related U.S. Application Data continuation of application No. 13/180,131, filed on Jul. 11, 2011, now Pat. No. 8,458,203.

(58) Field of Classification Search
USPC .................................................. 707/756, 807
See application file for complete search history.

(56) References Cited

U.S. PATENT DOCUMENTS

| | | | |
|---|---|---|---|
| 5,717,924 | A | 2/1998 | Kawai |
| 5,907,844 | A | 5/1999 | Guay et al. |
| 5,937,409 | A | 8/1999 | Wetherbee |
| 6,067,568 | A | 5/2000 | Li et al. |
| 6,192,380 | B1 | 2/2001 | Light et al. |
| 6,226,635 | B1 | 5/2001 | Katariya |
| 6,418,446 | B1* | 7/2002 | Lection ............. G06F 17/30896 |
| 6,615,219 | B1 | 9/2003 | Bruso et al. |
| 6,850,941 | B1 | 2/2005 | White et al. |
| 7,027,997 | B1 | 4/2006 | Robinson et al. |
| 7,624,114 | B2 | 11/2009 | Paulus et al. |
| 7,831,629 | B2 | 11/2010 | Simison et al. |
| 7,882,142 | B2 | 2/2011 | Parees et al. |
| 2001/0037345 | A1 | 11/2001 | Kiernan et al. |
| 2002/0049831 | A1 | 4/2002 | Platner et al. |
| 2002/0087346 | A1 | 7/2002 | Harkey |
| 2002/0091702 | A1 | 7/2002 | Mullins |
| 2002/0114435 | A1* | 8/2002 | Lawyer ................ H04M 15/00 379/114.14 |
| 2002/0173929 | A1 | 11/2002 | Seigel |
| 2003/0055830 | A1 | 3/2003 | Gutierrez-Rivas et al. |
| 2003/0172084 | A1 | 9/2003 | Holle |
| 2004/0148272 | A1 | 7/2004 | Raman et al. |
| 2004/0205533 | A1 | 10/2004 | Lopata et al. |
| 2004/0210445 | A1 | 10/2004 | Veronese et al. |
| 2004/0237045 | A1 | 11/2004 | Meltzer |
| 2004/0243555 | A1 | 12/2004 | Bolsius et al. |
| 2004/0267843 | A1 | 12/2004 | Dinh et al. |
| 2005/0060647 | A1 | 3/2005 | Doan et al. |
| 2005/0149575 | A1 | 7/2005 | Baune |
| 2005/0172223 | A1 | 8/2005 | Gibbons et al. |
| 2005/0216356 | A1 | 9/2005 | Pearce et al. |
| 2005/0257148 | A1 | 11/2005 | Goodman et al. |
| 2005/0262517 | A1 | 11/2005 | French |
| 2006/0064674 | A1 | 3/2006 | Olson, Jr. et al. |
| 2006/0085342 | A1 | 4/2006 | Chen et al. |
| 2006/0085451 | A1 | 4/2006 | Pal et al. |
| 2007/0282806 | A1 | 12/2007 | Hoffman et al. |
| 2008/0091698 | A1 | 4/2008 | Cook et al. |
| 2009/0063453 | A1 | 3/2009 | Adler et al. |
| 2009/0063524 | A1 | 3/2009 | Adler et al. |
| 2009/0234880 | A1 | 9/2009 | Madhavarapu et al. |
| 2011/0106811 | A1 | 5/2011 | Novoselsky et al. |
| 2011/0196900 | A1 | 8/2011 | Drobychev et al. |
| 2013/0246446 | A1 | 9/2013 | Taranov |

OTHER PUBLICATIONS

Hadhami Dhraief et. al., Processing and Optimization of Complex Queries in Schema-Based P2P-Networks, Proceedings:In DBISP2P, 2004 (15 pages).

Office Action dated Nov. 6, 2012 cited in U.S. Appl. No. 13/180,131.

Notice of Allowance dated Feb. 8, 2013, cited in U.S. Appl. No. 13/180,131.

Eigler, F., Proceeding CASCON '94 Proceedings of the 1994 conference of the Centre for Advanced Studies on Collaborative research p. 1-13, IBM Press copyright 1994.

Notice of Allowance dated Jul. 30, 2015, cited in U.S. Appl. No. 13/887,557.

"First Office Action and Search Report Issued in Chinese Patent Application No. 201280034189.5", dated Aug. 5, 2015, 12 Pages.

"Supplementary Search Report for European Patent Application 12810645.7", dated Sep. 24, 2015, 9 Pages.

"Partial Search Report Issued in European Patent Application No. 12810645.7", dated Feb. 13, 2015, 4 Pages.

"Supplementary Partial Search Report Issued in European Patent Application No. 12810645.7", dated Jun. 8, 2015, 5 Pages.

"Second Office Action and Search Report Issued in Chinese Patent Application No. 201280034189.5", dated Feb. 16, 2016, 7 Pages.

"International Search Report & Written Opinion Issued in PCT Application No. PCT/US2012/046328", dated Jan. 31, 2013, 9 Pages.

Prados, F., et al, "An Automatic Correction Tool for Relational Database Schemas", Information Technology Based Higher Education and Training, 2005. ITHET 2005. 6th International Conference on Jul. 7-9, 2005.

Thiran, Philippe, et al. "Database Wrappers Development: Towards Automatic Generation", Proceedings of the Ninth European Conference on Software Maintenance and Reengineering (CSMR'05), 2005, IEEE.

O. Corcho, et al. "ODESeW. Automatic Generation of Knowledge Portals for Intranets and Extranets", 16 pages. http://www.cs.man.ac.uk/~ocorcho/documents/ISWC2003_CorchoEtAl.pdf.

Jamia Prakash M. Nadkarni, MD, et al. "WebEAV Automatic Metadata-driven Generation of Web Interfaces to Entity-Attribute-Value Databases" 23 pages. Journal List>J Am Med Inform Assoc>v. 7(4); Jul.-Aug. 2000. http://www.pubmedcentral.nih.gov/articlerender/fcgi?artid=61439.

Andreas Eberhart. "Automatic Generation of Java/SQL Based Inference Engines from RDF Schema and RuleML" 1 page. vol. 2342/2002. Jun. 9-12, 2002. http://www.springerlink.com/_(wc130fn0gxpSun55tn4db455)_/app/home/contribution.asp?referr=parent&backto=issue,10,42;journal,1578,3811;linkingpublicationresults,1:105633,1.

* cited by examiner

OPTIMIZING DATA PROCESSING USING DYNAMIC SCHEMAS

CROSS-REFERENCE TO RELATED APPLICATIONS

This application is a continuation of U.S. patent application Ser. No. 13/887,557, filed May 6, 2013, and entitled "OPTIMIZING DATA PROCESSING USING DYNAMIC SCHEMAS," and which issued as U.S. Pat. No. 9,218,403 on Dec. 22, 2015, which is a continuation of U.S. patent application Ser. No. 13/180,131, filed Jul. 11, 2011, and entitled "OPTIMIZING DATA PROCESSING USING DYNAMIC SCHEMAS," and which issued as U.S. Pat. No. 8,458,203 on Jun. 4, 2013. The entire contents of each of the foregoing applications are incorporated by reference herein in their entireties.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, applications may communicate with databases to store data. These databases may receive the data and store and process it according to predefined, static data schemas. These data schemas are specific to each type of data, and only a certain number of static, predefined schemas can be used in a given database implementation.

BRIEF SUMMARY

Embodiments described herein are directed to efficiently uploading data to a database using dynamic schemas and to efficiently processing data using dynamic schemas. In one embodiment, a computer system accesses rows of feed data. The feed data includes data fields of fixed and varying lengths. The computer system converts the received feed data into portions of binary blob data. The binary blob data is allocated in fixed-size data portions representing feed rows. Varying length feed fields are represented by both a fixed-size field, with a length of the feed field, and a reference into the blob data that includes the actual varying size feed data. The computer system also sends the binary blob data to a database server. The database server is configured to access metadata associated with a feed. Metadata contains dynamic server statement to determine how to convert the binary blob data to a server table with a BLOB column configured to store the rows of feed data.

In another embodiment, a database server receives from an application server various portions of binary blob data. The database server executes a dynamic server statement to store the binary blob data into a database table. The dynamic server statement is stored within metadata associated with the feed. The database server restores feed data rows from the binary blob data by substituting varying size references with the actual feed data, while keeping the feed data in a binary format. The database server also stores the restored feed data in the database table in a BLOB data column. Each feed data row results in one binary blob value in one corresponding row in the database table.

In yet another embodiment, a database server accesses feed data belonging to a particular feed and executes a dynamic server statement to create a relational dataset with data type fields from the feed data in an in-memory table of the server. The dynamic server statement is stored within metadata associated with the feed. Then database server applies a second dynamic server statement to the data feed which applies data processing conditions indicated in the metadata. Also, upon determining that one or more feed data rows match the data processing conditions the database server places feed data row information about the matching data rows into an alert table that includes references to the table with the BLOB column containing the feed data, thereby triggering an alert.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
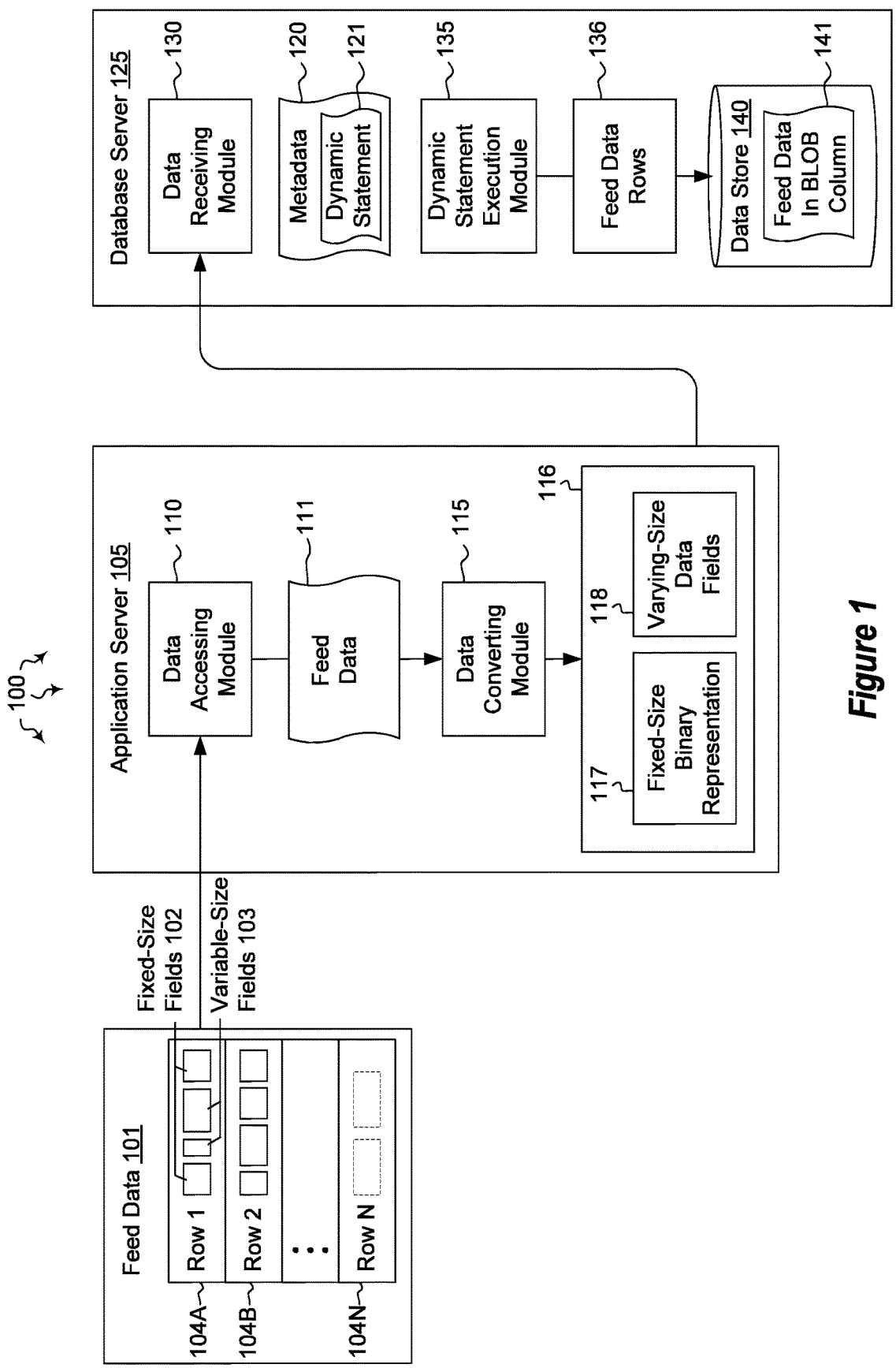
FIG. 1 illustrates a system architecture in which embodiments of the present invention may operate including efficiently uploading data to a database using dynamic schemas.

Embodiments described herein are directed to efficiently uploading data to a database using dynamic schemas and to efficiently processing data using dynamic schemas. In one embodiment, a computer system accesses rows of feed data. The feed data includes data fields of fixed and varying lengths. The computer system converts the received feed data into portions of binary blob data. The binary blob data is allocated in fixed-size data portions representing feed rows. Varying length fields are represented by both a fixed-size field, with a length of the feed field, and a reference into the blob data that includes the actual varying size feed data. The computer system also sends the binary blob data to a database server. The database server is configured to access metadata associated with a feed. Metadata contains dynamic server statement to determine how to convert the binary blob data to a server table with a BLOB column configured to store the rows of feed data.

In another embodiment, a database server receives from an application server various portions of binary blob data. The database server executes a dynamic server statement to store the binary blob data into a database table. The dynamic server statement is stored within metadata associated with the blob data's original feed. The database server restores feed data rows from the binary blob data by substituting varying size references with the actual feed data, while keeping the feed data in a binary format. The database server also stores the restored feed data in the database table in a BLOB data column. Each feed data row results in one binary blob value in one corresponding row in the database table.

In yet another embodiment, a database server accesses feed data belonging to a particular feed and executes a dynamic server statement to create a relational dataset with data type fields from the feed data in an in-memory table of the server. The dynamic server statement is stored within metadata associated with the feed. The database server applies a second dynamic server statement to the data feed which applies data processing conditions indicated in the metadata. The dynamic server statement is stored within the metadata associated with the feed. Also, upon determining that one or more feed data rows match the data processing conditions the computer system places feed data row information about the matching data rows into an alert table that includes references to the table with the BLOB column containing the feed data, thereby triggering an alert.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a system architecture 100 in which the principles of the present invention may be employed. System architecture 100 includes an application server system 105 and a database server 125. These computer systems may be any type of local or distributed computer systems. Various embodiments will be described in relation to these computer systems. For instance, embodiments relating to high efficiency bulk upload of data with dynamic schemas, high efficiency processing of data with dynamic schemas and compact storage of data with dynamic schemas will all be described.

For instance, a method may be provided that allows uploading of a data of a large volume and with arbitrary schemas by applying the same binary upload approach regardless of the particular schema used. The application server system 105 reads data from an arbitrary feed 101 and packs it in a binary format (blob) 116 as described in FIG. 1. The format allows representing the feed data that might have fields of a varying size by rows with fixed length. Varying size fields are represented by fixed size field data length and references into the second part of the blob, containing the actual varying size data.

For scalability purposes, large feed data is chunked into pieces according to various specifications (e.g., the number of rows is less than 10000 or chunk size is less than 10 MB, etc.). Each chunk may be uploaded to the database server 125 in a single round trip. The database server reads data and stores it in a table in data store 140. The database server is aware of the data schema due to the metadata stored for each registered feed. Metadata includes dynamic server statements that the database server can execute dynamically when reading and storing data. The database server side restores the feed data rows by substituting the varying size references with the actual data, but still keeping all data in a binary format. As a result the feed data is stored in the database table in the BLOB column 141, where each feed row results in one blob value in the corresponding row in the table. It should be noted that field data for fields with varying data size may be different in size for the same field within one feed data reading session.

Figure 5:
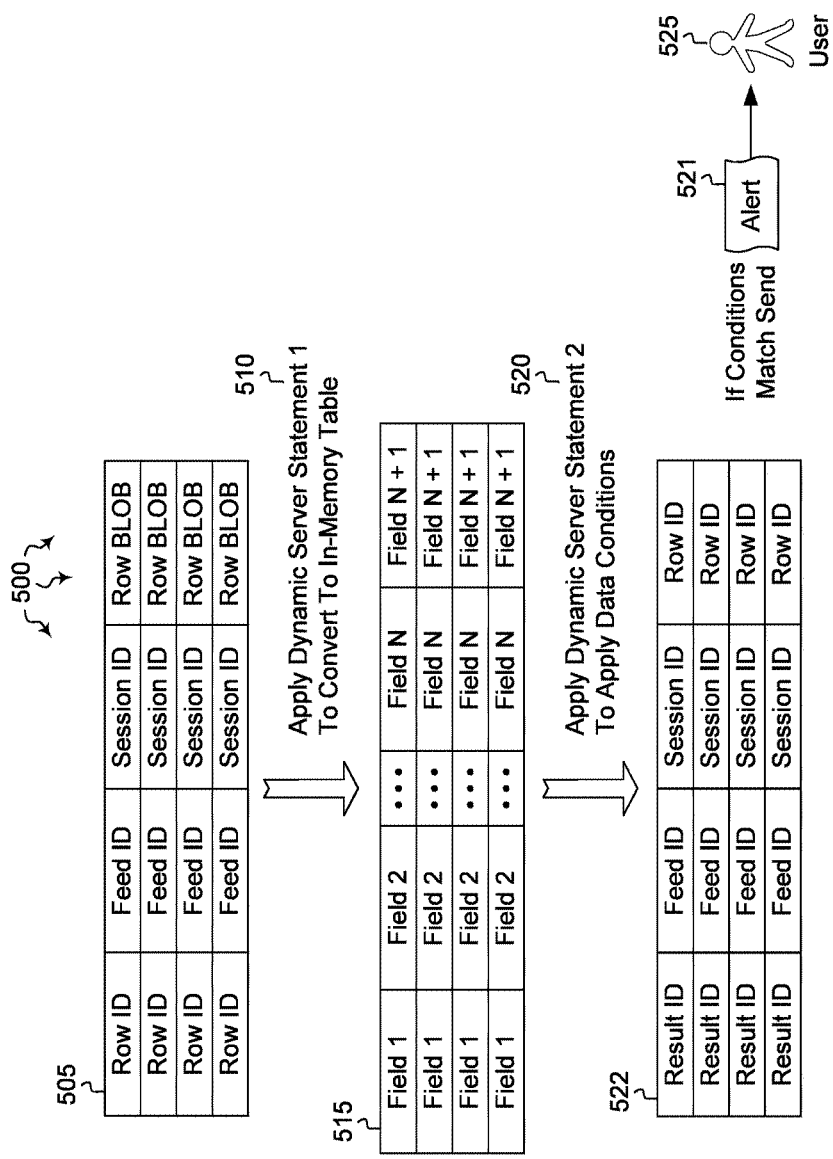
FIG. 5 illustrates a database server side example application of dynamic server statements for efficiently processing data using dynamic schemas.

Regarding high efficiency processing of data with dynamic schemas, when processing data the database server 125 builds and executes various dynamic server statements, as shown in FIG. 5. Portions of the various dynamic statements are taken from the feed metadata as well. The dynamic statements may be configured to perform the following: reformats incoming feed blob data 116 to represent one row data with one binary value in BLOB column of a database table, reads the feed data 140 belonging to a particular feed reading session from a database table, creates an in-memory database server relational table using various server commands with the definition from the metadata, and applies one or more data processing conditions that are also taken from the metadata. For the rows that satisfy the data conditions, the server side creates references in another database table, pointing to the original database table that contains the binary feed data.

Regarding compact storage of data with dynamic schemas, the database server 125 may provide compact efficient data storage close in size as if the feed data was stored in a static table. This result may be achieved as the feed data is stored only in the binary format. The metadata is stored per feed registration and so its size is of the same order (i.e. like it would be for a static database table). The system also allows detection of the data change between subsequent feed reading sessions by hashing each feed row blob value. The database server uses the data change detection mechanism to avoid storing of duplicate data. Each of these concepts will be explained in greater detail below with regard to methods 200, 300 and 400 of FIGS. 2, 3 and 4, respectively.

Figure 2:
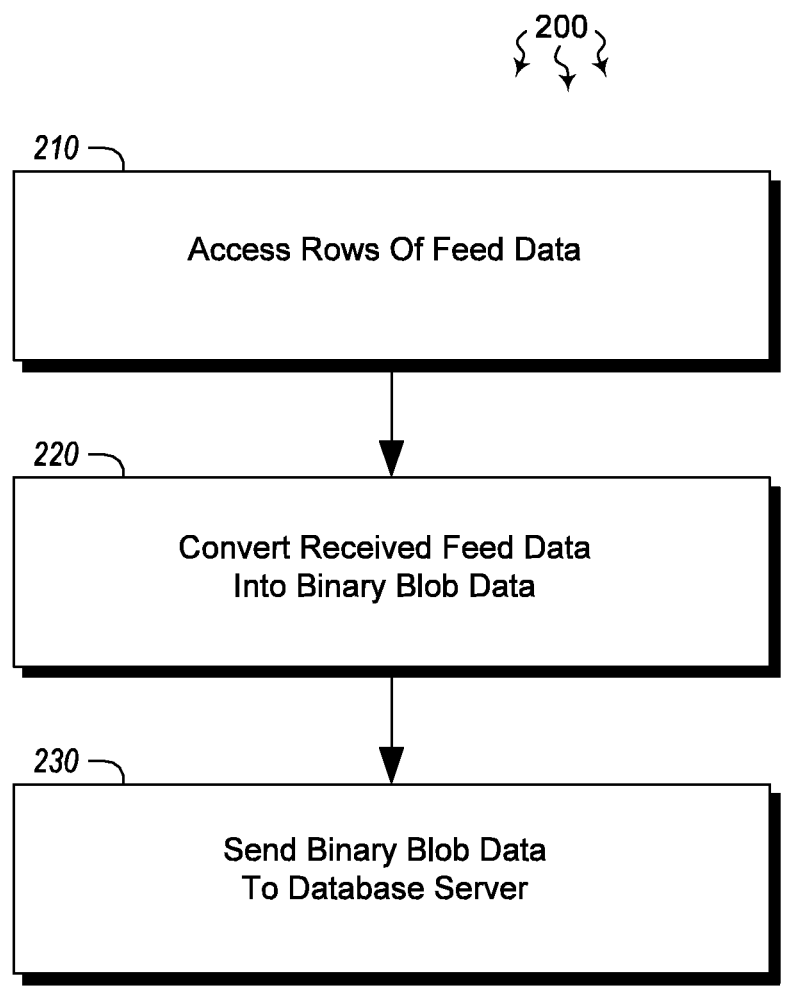
FIG. 2 illustrates an application server side flowchart of an example method for efficiently uploading data to a database using dynamic schemas.
Figure 3:
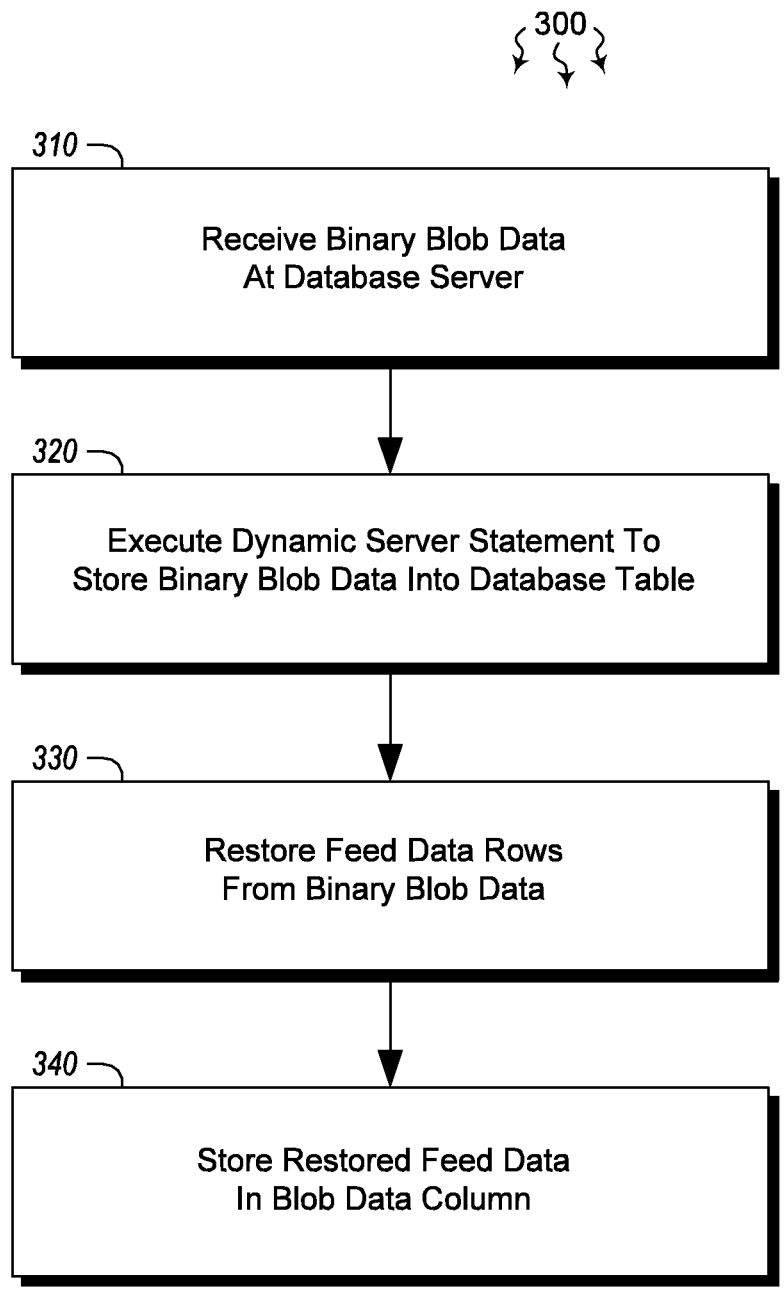
FIG. 3 illustrates a database server side flowchart of an example method for efficiently uploading data to a database using dynamic schemas.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for efficiently uploading data to a database using dynamic schemas. The method 200 will now be described with frequent reference to the components and data of environment 100.

Method 200 includes an act of accessing one or more rows of feed data, the feed data including one or more data fields of fixed and varying lengths (act 210). For example, data accessing module 110 may access feed data 101. Feed data 101 includes multiple different rows of data, including row 1 (104A), row 2 (104B) and so on to row N (104N). As will be understood, substantially any number of rows may be included in feed data 110. The data may include fixed-size fields 102 or variable-size fields 103. Any given feed row data may include only fixed-size fields, only variable-size fields, or combinations of both. The feed data is represented by various extensible markup language (XML) files which include a definition of each field including the field's data type and data length. This field definition may be used by the data converting module 115 to convert the feed data to binary blob data 116 using a dynamic schema.

Method 200 includes an act of converting the received feed data into one or more portions of binary blob data, wherein the binary blob data is allocated in fixed-size data portions representing feed rows, and wherein varying length fields are represented by both a fixed-size field and a reference into the blob data that includes the actual varying size feed data (act 220). For example, data converting module 115 may convert received feed data 111 into various portions of blob data 116. The binary blob data may include two different portions. The first portion 117 includes fixed-size binary representations of each row, while second portion 118 contains data of varying-size fields. The first portion may contain references to the second portion for varying-size fields.

In some cases, the binary blob data representing multiple feed rows is sent to the database server 125 in a single round trip. Thus, rather than requiring one round trip for each row or table that is to be updated, all of the blob data may be sent to the database in a single round trip. The same technique may be used for converting and uploading data to a database server regardless of a particular feed data's schema and sizes. Still further, various portions of field data for fields with varying data size may be different in size for the same field within a feed data reading session. Thus, at any given data reading, variable-size field data may differ in size for the same field, allowing for great flexibility in storing data in a database table data.

Method 200 includes an act of sending the binary blob data to a database server, the database server being configured to access metadata associated with a dynamic server statement to determine how to convert the binary blob data to a server table with a BLOB column configured to store the rows of feed data (act 230). For example, application server system 105 may send binary blob data 116 to database server 125. The database server accesses metadata 120 which includes a dynamic server statement. The metadata indicates to the server how the binary blob data is to be converted to a server table with a blob column 141 configured to store the rows of feed data 101. Execution of the dynamic server statement 121 (e.g. by module 135) then converts the data and stores it in data store 140.

In some cases, the application server may further determine that the binary blob data 116 is to be divided into data chunks. Each data chunk is uploaded to the database server 125 in one round trip. The application server determine that the binary blob data dividing is to occur based on one or more conditions. The conditions may include any one or more of the following: the number of rows in the binary blob data and the data size of the binary blob data. If one or more of the condition occurs (e.g. the blob data has a certain number of rows, or the data size is sufficiently large), then the data will be divided in a predetermined manner based on the condition that occurred. Still further, a database server presentation of the feed data is generated, where each feed row in feed data 101 is represented in a database table by one row with a single BLOB column containing feed row binary data (e.g. BLOB column 141 in data store 140).

FIG. 3 illustrates a flowchart of a method 300 for efficiently uploading data to a database using dynamic schemas. The method 300 will now be described with frequent reference to the components and data of environments 100 and 500 of FIGS. 1 and 5, respectively.

Method 300 includes an act of receiving from an application server one or more portions of binary blob data at a database server (act 310). For example, data receiving module 130 may receive binary blob data 116. This binary blob data may include fixed-size binary representation 117 and varying-size data fields 118.

Method 300 includes an act of executing a dynamic server statement to store the binary blob data into a database table, wherein the dynamic server statement is stored within metadata associated with the original feed (act 320). For example, the same technique may be used for converting and storing feed binary data in the BLOB column of a database table regardless of a particular feed data schema. In this manner, using of the static schemas may be avoided, as the schemas (or dynamic server statements) used are dynamic. Moreover, because the blob data is processed substantially entirely in memory, the data processing is performed in a highly efficient manner.

Method 300 further includes an act of restoring one or more feed data rows from the binary blob data by substituting varying size references with the actual feed data, while keeping the feed data in a binary format (act 330). For example, database server 125 may restore feed data rows 136 from the binary blob data by substituting different size references with the feed data 101, while keeping the data in a binary format. Maintaining the data in a binary format allows the blob data to be processed by the database server in a highly efficient manner.

Method 300 also includes an act of storing the restored feed data in the database table in a blob data column, wherein each feed data row results in one binary blob value in one corresponding row in the database table (act 340). For example, database server 125 may store the restored feed data rows 136 in data store 140 in BLOB column 141.

Figure 4:
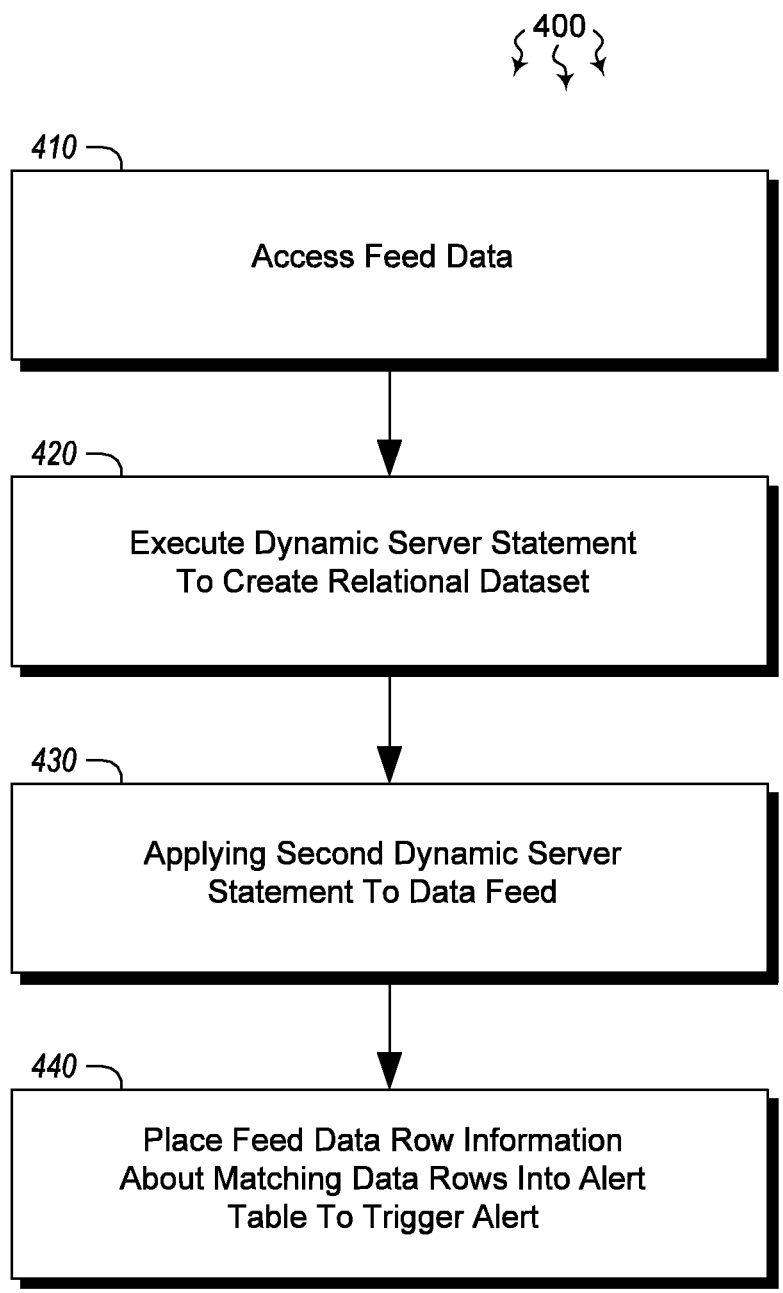
FIG. 4 illustrates a database server side flowchart of an example method for efficiently processing data using dynamic schemas.

FIG. 4 illustrates a flowchart of a method 400 for efficiently processing data using dynamic schemas. The method 400 will now be described with frequent reference to the components and data of environments 100 and 500 of FIGS. 1 and 5, respectively.

Method 400 includes an act of accessing feed data belonging to a particular feed (act 410). The database server then executes a dynamic server statement 510 to create a relational dataset with data type fields from the feed data in an in-memory table 515 of the server. The dynamic server statement is stored within metadata 120 associated with the feed data (act 420). The feed data is processed in the memory of the server, thus not requiring a corresponding static table, to aid in processing efficiency.

Method 400 further includes an act of applying a second dynamic server statement 520 to the feed data which applies various data processing conditions indicated in the metadata 120. The dynamic server statement is stored within the metadata associated with the feed (act 430). Then, upon determining that one or more feed data rows in database table 500 matches the data processing conditions, the feed data row information about the matching data rows is placed into an alert table that includes references to the original database table with feed blob data in BLOB column, thereby triggering an alert (act 440). Items placed in the alert table thus automatically issue an alert 521 to a user 525 that has subscribed to receive those alerts. Thus, the user can be apprised upon the occurrence of any of a number of different user-specifiable conditions. Moreover, referencing feed blob data from the original database table avoids duplicate data storing and using static representations of the feed fields.

Accordingly, methods, systems and computer program products are provided which efficiently upload data to a database using dynamic server statements. Moreover, methods, systems and computer program products are provided which efficiently process and store data using dynamic server statements. Such uploading, processing and storing may lead to a more efficient data management system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:
1. A computer system, comprising:
   one or more processors;
   system memory; and
   one or more computer-readable storage media having stored thereon computer-executable instructions that are executable by the one or more processors to configure the computer system to efficiently process data using dynamic schemas, the computer-executable instructions including instructions that are executable to configure the computer system to perform at least the following:
      access feed data belonging to a particular feed comprising a plurality of records;
      convert one or more records of the plurality of records into a binary blob data table including, for each record being converted:
         creating a record containing at least one record identifier; and
         creating a binary blob that includes binary information representing a plurality of fields within the record and including metadata indicating data processing conditions for processing the plurality of fields;

execute a dynamic server statement on the binary blob data table to create a relational dataset with data type fields from the one or more converted records of the binary blob data table in an in-memory table of the server, wherein the dynamic server statement is stored within the metadata associated with the binary blob of the one or more converted records;

apply a second dynamic server statement to the in-memory table to create an alert table based on at least one or more of the data processing conditions indicated in the metadata, wherein the second dynamic server statement is stored within the metadata associated with the binary blob; and upon determining that a binary blob of the one or more converted records matches the data processing conditions, place a reference to the matching binary blob data table record into an alert table, thereby triggering an alert.

2. The computer system of claim 1, wherein the feed data is processed in the system memory, and not in a corresponding static table.

3. The computer system of claim 1, wherein the alert table includes reference to a database table with a binary feed data rather than static representations of the feed fields.

4. The computer system of claim 1, wherein one or more portions of at least one of the dynamic server statement or the second dynamic server statement is taken from the metadata.

5. The computer system of claim 1, wherein at least one of the dynamic server statement or the second dynamic server is configured to reformat incoming blob data to represent one row of data with one binary value in a blob column of a database table.

6. The computer system of claim 1, wherein at least one of the dynamic server statement or the second dynamic server is configured to read the feed data belonging to a particular feed reading session from a database table.

7. The computer system of claim 1, wherein items placed in the alert table automatically cause an alert to be issued to any user that has subscribed to receive those alerts.

8. A method, implemented at a computer system that includes one or more processors, for efficiently processing data using dynamic schemas, the method comprising:

accessing feed data belonging to a particular feed comprising a plurality of records;

converting one or more records of the plurality of records into a binary blob data table including, for each record being converted:
creating a record containing at least one record identifier; and
creating a binary blob that includes binary information representing a plurality of fields within the record and including metadata indicating data processing conditions for processing the plurality of fields;

executing a dynamic server statement on the binary blog data table to create a relational dataset with data type fields from the one or more converted records of the binary blob data table in an in-memory table of the server, wherein the dynamic server statement is stored within the metadata associated with the binary blob of the one or more converted records;

applying a second dynamic server statement to the in-memory table to create an alert table based on at least one or more of the data processing conditions indicated in the metadata, wherein the second dynamic server statement is stored within the metadata associated with the binary blob; and upon determining that a binary blob of the one or more converted records matches the data processing conditions, placing a reference to the matching binary blob data table record into an alert table, thereby triggering an alert.

9. The method of claim 8, wherein the feed data is processed in system memory, and not in a corresponding static table.

10. The method of claim 8, wherein the alert table includes reference to a database table with a binary feed data rather than static representations of the feed fields.

11. The method of claim 8, wherein one or more portions of at least one of the dynamic server statement or the second dynamic server statement is taken from the metadata.

12. The method of claim 8, wherein at least one of the dynamic server statement or the second dynamic server is configured to reformat incoming blob data to represent one row of data with one binary value in a blob column of a database table.

13. The method of claim 8, wherein at least one of the dynamic server statement or the second dynamic server is configured to read the feed data belonging to a particular feed reading session from a database table.

14. The method of claim 8, wherein items placed in the alert table automatically cause an alert to be issued to any user that has subscribed to receive those alerts.

15. A computer program product comprising one or more hardware storage devices having stored thereon computer-executable instructions that are executable by one or more processors to configure a computer system to efficiently process data using dynamic schemas, the computer-executable instructions including instructions that are executable to configure the computer system to perform a least the following:

access feed data belonging to a particular feed comprising a plurality of records;

convert one or more records of the plurality of records into a binary blob data table including, for each record being converted:
creating a record containing at least one record identifier; and
creating a binary blob that includes binary information representing a plurality of fields within the record and including metadata indicating data processing conditions for processing the plurality of fields;

execute a dynamic server statement on the binary blob data table to create a relational dataset with data type fields from the one or more converted records of the binary blob data table in an in-memory table of the server, wherein the dynamic server statement is stored within the metadata associated with the binary blob of the one or more converted records;

apply a second dynamic server statement to the in-memory table to create an alert table based on at least one or more of the data processing conditions indicated in the metadata, wherein the second dynamic server statement is stored within the metadata associated with the binary blob; and upon determining that a binary blob of the one or more converted records matches the data processing conditions, place a reference to the matching binary blob data table record into an alert table, thereby triggering an alert.

16. The computer program product of claim 15, wherein the feed data is processed in system memory, and not in a corresponding static table.

17. The computer program product of claim 15, wherein the alert table includes reference to a database table with a binary feed data rather than static representations of the feed fields.

18. The computer program product of claim 15, wherein one or more portions of at least one of the dynamic server statement or the second dynamic server statement is taken from the metadata.

19. The computer program product of claim 15, wherein at least one of the dynamic server statement or the second dynamic server is configured to perform at least one of: (i) reformat incoming blob data to represent one row of data with one binary value in a blob column of a database table or (ii) read the feed data belonging to a particular feed reading session from a database table.

20. The computer program product of claim 15, wherein items placed in the alert table automatically cause an alert to be issued to any user that has subscribed to receive those alerts.

* * * * *